US008108560B2

(12) United States Patent
Shankar et al.

(10) Patent No.: US 8,108,560 B2
(45) Date of Patent: Jan. 31, 2012

(54) METHOD AND APPARATUS FOR MANAGING DATA TRANSFER IN A COMPUTER MEMORY

(75) Inventors: Ganesh Handige Shankar, Kamataka (IN); Anand S. Medikari, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1039 days.

(21) Appl. No.: 11/283,879

(22) Filed: Nov. 22, 2005

(65) Prior Publication Data

US 2006/0112136 A1    May 25, 2006

(30) Foreign Application Priority Data

Nov. 24, 2004  (GB) .................................. 0425881.0

(51) Int. Cl.
*G06F 15/16* (2006.01)
(52) U.S. Cl. .......... 709/250; 703/203; 703/237; 710/52; 711/6
(58) Field of Classification Search ........ 711/6; 710/52; 709/237, 203
See application file for complete search history.

(56) References Cited

U.S. PATENT DOCUMENTS

| | | | | |
|---|---|---|---|---|
| 4,577,274 A | * | 3/1986 | Ho et al. ........................ | 711/205 |
| 5,931,925 A | * | 8/1999 | McNabb et al. ................ | 710/52 |
| 6,075,938 A | * | 6/2000 | Bugnion et al. ................ | 703/27 |
| 6,789,156 B1 | * | 9/2004 | Waldspurger .................... | 711/6 |
| 6,799,200 B1 | * | 9/2004 | Blackmore et al. ........... | 709/212 |
| 6,955,727 B2 | * | 10/2005 | Korbler et al. .................... | 134/1 |
| 7,115,558 B2 | * | 10/2006 | White et al. ...................... | 514/2 |
| 7,152,148 B2 | * | 12/2006 | Williams et al. .............. | 711/164 |
| 7,330,862 B1 | * | 2/2008 | Srinivasan et al. ............ | 707/205 |
| 7,529,897 B1 | * | 5/2009 | Waldspurger et al. ........ | 711/162 |
| 7,581,173 B1 | * | 8/2009 | Ferguson et al. ............. | 715/235 |
| 2004/0205373 A1 | * | 10/2004 | Shoaib et al. ..................... | 714/1 |
| 2005/0021303 A1 | * | 1/2005 | Matsushita et al. ........... | 702/185 |

FOREIGN PATENT DOCUMENTS

EP    0 238 158 B1   12/1995
EP    0238158 B1    12/2005

OTHER PUBLICATIONS

M. Nelson, et al; "Copy-On-Write for Sprite"; Proceedings of the Summer 1988 USENIX Conference, 1998, pp. 187-201.
Phillips et al "Shared Page Tables, First Result," http://www.ussg.iu.edu/hepmail/linux/kernel/0202.1/11070.html, Feb. 12, 2002.

(Continued)

*Primary Examiner* — Krista Zele
*Assistant Examiner* — James Q Forman

(57) ABSTRACT

The present invention relates to a method of transferring data from an application buffer to a network socket, in which memory usage faults are reduced. In one embodiment, the method for managing data transfer in a computer memory includes transferring data from an application program memory to a network stack using zero copy data transfer, monitoring the number of potential copy on write (COW) faults generated during the transfer of data for the application program, and controlling the transferring of data so that if the number of potential COW faults exceeds a predetermined threshold for the application then in subsequent data transfers from the application program, data is copied to another memory location before transferring the data to the network stack.

17 Claims, 2 Drawing Sheets

OTHER PUBLICATIONS

"doc.sun.com: Solaris Tracin Guide"; http://dacs.dun.com/app/docs/doc/817-6223/6mlkidllkq?a=view, Nov. 2, 2005.

M.Nelson et al.,"Copy-On-Write for Sprite";Proceedings of the Summer 1988 USENIX Conference,1998,pp. 187-201.

Phillips et al "Shared Page Tables, First Result,", http://www.ussg.iu.edu/hepmail/linux/kernel/0202.1/11070.html, Feb. 12, 2002.

"doc.sun.com: Solaris Tracin Guide"; http://dacs.sun.com/app/docs/doc/8176223/6mlkidllkq?a=view, Nov. 2, 2005.

* cited by examiner

METHOD AND APPARATUS FOR MANAGING DATA TRANSFER IN A COMPUTER MEMORY

FIELD OF INVENTION

The present invention relates to a method and apparatus for managing data transfer in a computer memory. More particularly, but not exclusively, the present invention relates to a method of transferring data from an application buffer to a network socket, in which copy avoidance is carried out adaptively so as to reduce memory usage faults.

BACKGROUND OF THE INVENTION

Typically, when data is transferred from one computer to another over a TCP/IP (Transfer Control Protocol/Internet Protocol) network, the application program data is first copied from application program memory space to a network buffer in kernel memory space. Application memory and kernel memory are separate memory spaces and are also referred to as protection domains as they protect the data in one domain from interference by programs in other domains. Once the data has been copied into kernel memory, the sockets and networking stack (TCP/IP stack) in the kernel are used to pass the data over the network. In a typical TCP/IP implementation many CPU (Central Processing Unit) cycles are consumed copying data across protection domains as outlined by David Clark et al in Analysis of TCP Processing Overhead, IEEE Communications Magazine, June 1989, Volume 27, Number 6.

One approach to reducing the burden on the CPU in copying data across domains is the use of zero copy techniques. Such techniques avoid the need for copying between protection domains, instead enabling data to be supplied directly to the network stack for transmission to its destination over the network. Zero copy implementations can provide significant increase in performance in terms of data throughput and CPU utilisation. There are two types of approaches to achieve zero copy implementation in a network stack as outlined by H K Jerry Chuin in Zero-Copy TCP in Solaris™, Proceedings of the USENIX, 1996 Annual Technical Conference, San Diego, Calif., January 1996. The first approach is based on shared buffer semantics and second approach is based on virtual copy semantics. Though shared buffer approaches may provide good solutions, they generally call for significant application program source code changes. Virtual copy approaches do not require such code changes. Generally on the send or transmit stage, zero copy is implemented using virtual memory (VM) support. One such method referred to as page remapping with Copy On Write (COW) is used by the Solaris™ operating system as outlined in Zero-Copy TCP in Solaris™ noted above. U.S. Pat. No. 5,182,805 discusses a COW mechanism.

In this zero copy approach, in order to avoid copying data from application program memory space into kernel (operating system) memory space, the application program memory address is remapped into the kernel memory space. In other words, the application memory space becomes a virtual part of the kernel memory space. However, if the application program attempts to change the contents of the remapped memory while it is being used by the kernel, a fault is generated which is referred to as a COW fault. The result of a COW fault is that the original application data is copied from the remapped memory space into kernel memory. As a result, a zero copy operation which generates a COW fault is more costly than the simple application to kernel copy. Some of applications are particularly susceptible to COW faults as outlined by Peter Druschel and Larry L. Peterson in Fbufs: A High-Bandwidth Cross-Domain Transfer Facility, Proceedings of the Fourteenth ACM Symposium on Operating Systems Principles, December 1993. Susceptibility to COW faults is dependent on various factors such as link speed, type of connection (TCP/UDP), round trip delay, and application behaviour.

It is an object of the present invention to provide a method or apparatus for managing data transfer in a computer memory, which reduces the overhead of dealing with COW faults.

It is an object of the present invention to provide a method or apparatus for managing data transfer in a computer memory, which avoids some of the above disadvantages or at least provides the public with a useful choice.

SUMMARY OF THE INVENTION

According to a first aspect of the invention there is provided a method for managing data transfer in a computer memory comprising the steps of:

a) transferring data from an application program memory to a network stack using zero copy data transfer;

b) monitoring the number of potential copy on write (COW) faults generated during the transfer of data for the application program; and c) controlling the transferring of data so that if the number of potential COW faults exceeds a predetermined threshold for the application then in subsequent data transfers from the application program, data is copied to another memory location before transferring the data to the network stack.

Preferably in step a) the zero copy data transfer is provided by page remapping. Preferably in step b) the monitoring is carried out for a plurality of application programs and the results of the monitoring are recorded in a record. Preferably the record entry for each application includes the port number, number of writes to the socket and the number of potential COW faults associated with the application. Preferably the other memory is kernel memory. Preferably the monitoring and controlling steps are carried out by the networking or socket code. Preferably if the number of potential COW faults for the application falls below the predetermined threshold then in subsequent data transfers reverting to the use of zero copy data transfer. Preferably the threshold is determined by the percentage of data transfers that produce potential COW faults for a given application. Preferably the threshold is 30%. Alternatively the threshold is 50%.

According to a second aspect of the invention there is provided apparatus for managing data transfer in a computer memory comprising:

a) transfer means operable to transfer data from an application program memory to a network stack using zero copy data transfer;

b) monitoring means operable to monitor the number of potential copy on write (COW) faults generated during the transfer of data for the application program; and c) control means operable if the number of potential COW faults exceeds a predetermined threshold for the application to control subsequent data transfers from the application program so that data is copied to another memory location before transferring the data to the network stack.

According to a third aspect of the invention there is provided a computer program or group of computer programs arranged to enable a computer or group of computers to carry out a method for managing data transfer in a computer memory comprising the steps of:

a) transferring data from an application program memory to a network stack using zero copy data transfer;

b) monitoring the number of potential copy on write (COW) faults generated during the transfer of data for the application program; and c) controlling the transferring of data so that if the number of potential COW faults exceeds a predetermined threshold for the application then in subsequent data transfers from the application program, data is copied to another memory location before transferring the data to the network stack.

According to a fourth aspect of the invention there is provided a computer program or group of computer programs arranged to enable a computer or group of computers to provide an apparatus for managing data transfer in a computer memory comprising:

a) transfer means operable to transfer data from an application program memory to a network stack using zero copy data transfer;

b) monitoring means operable to monitor the number of potential copy on write (COW) faults generated during the transfer of data for the application program; and c) control means operable if the number of potential COW faults exceeds a predetermined threshold for the application to control subsequent data transfers from the application program so that data is copied to another memory location before transferring the data to the network stack.

According to a fifth aspect of the invention there is provided a method of controlling data transfer between an application program layer and a socket layer in a Unix operating system comprising:

a) transferring data using zero copy transfer;

b) monitoring the number of actual copy on write (COW) faults generated by an application; and c) if the number of monitored COW faults exceeds a threshold for the application then transferring subsequent data using normal copy transfer.

Preferably, in step b) the potential COW faults are monitored and used in step c).

BRIEF DESCRIPTION OF THE DRAWINGS

Embodiments of the invention will now be described, by way of example only, with reference to the accompanying drawings in which.

DETAILED DESCRIPTION OF A PREFERRED EMBODIMENT OF THE INVENTION

Figure 1:
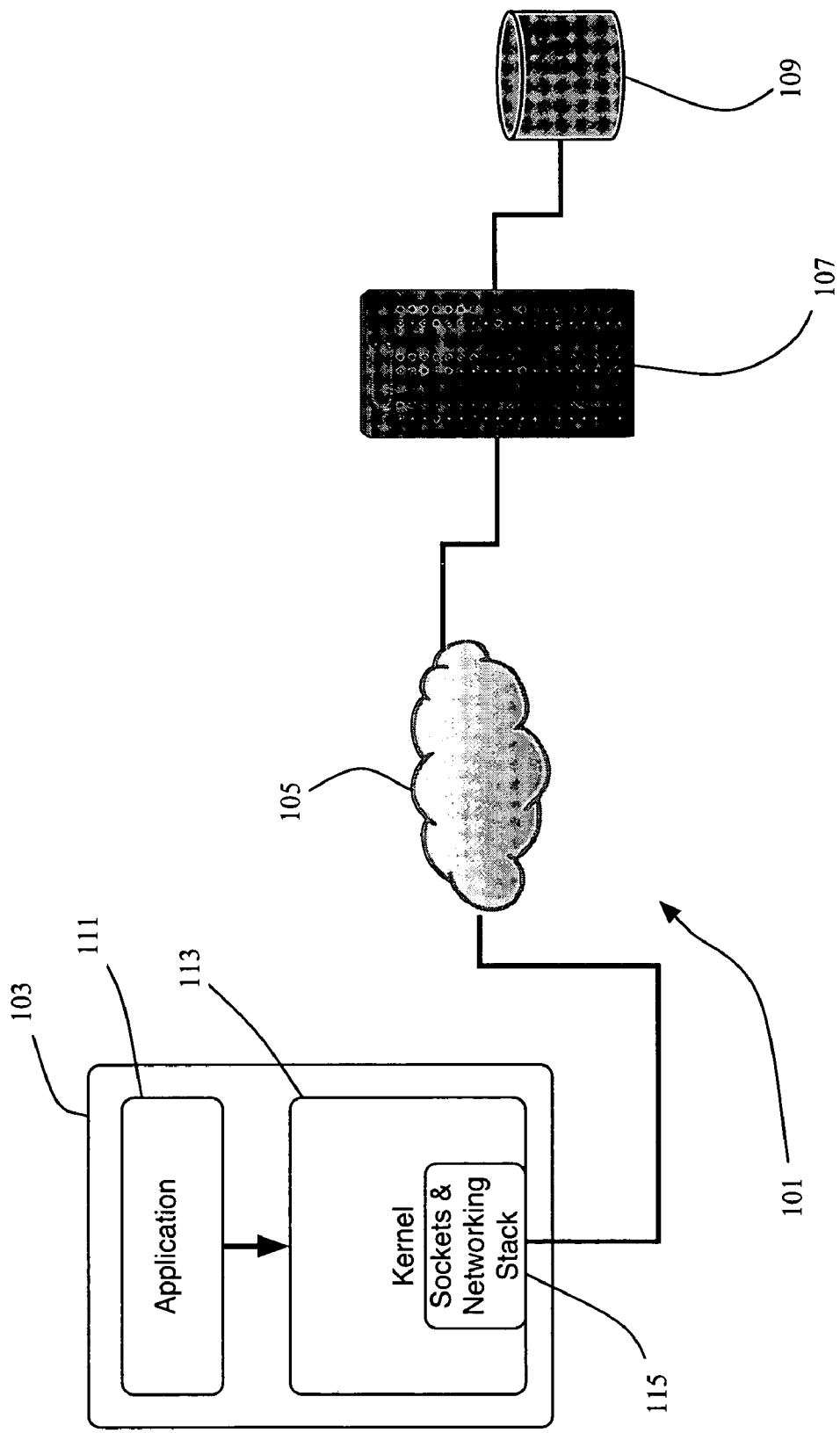
FIG. 1 is a schematic illustration of a computer network according to an embodiment of the present invention.

With reference to FIG. 1, a computer system 101 comprises a client computer 103 connected over an IP network 105 to a server computer 107 which in turn is connected to a storage device 109. The client computer 103 is running a version of the Unix™ operating system such as HP-UX™ which provides access over the network 105 to a database application program running on the server computer 107. The data used by the database application program is stored on the storage device 109 and is accessed over the network by the user of the client computer 103 via a client database application program.

The Unix™ operating system on the client computer 103 includes an application program module 111 and an operating system kernel module 113. The kernel module 113 is the central module of the operating system and is responsible for memory management, process and task management and disk management. The kernel 113 includes network sockets and a networking stack 115 which provides a software interface to the physical network 105. Each socket is identified by a designated number. The application program 111 can send and receive TCP/IP messages across the network 107 via the sockets and networking stack 115 by writing to one of the sockets provided. Some sockets are reserved for use by important or commonly used application programs.

When the application program 111 uses a designated socket to communicate with the database application running on the server computer 107, the application program performs a write on the socket and the contents of an application program buffer holding the data to be transmitted is copied to a kernel module buffer. The kernel module then uses its sockets and networking stack to transmit the data over the network 105. When page remapping is used to provide a zero copy data transmission, the address of the application buffer is remapped into the kernel module's address space thus becoming virtual memory for the kernel module 113. This saves the overhead of copying the data between application and kernel address spaces. The kernel simply accesses the remapped buffer and passes the data to the network socket module 115. If the application program 111 attempts to change the contents of the remapped memory while it is being used by the kernel module 113, a fault is generated which is referred to as a COW fault. The result of a COW fault is that the original application data is copied from the remapped memory space into kernel memory. As a result the zero copy operation generates a COW fault and is more costly than an application to kernel copy (a normal copy).

In the present embodiment, the operating system of the client computer 103 implements zero copy data transfers adaptively. In other words, the zero copy mechanism is selectively activated at run time based on recorded behaviour of application programs. If a given application program appears to be prone to COW faults then the zero copy mechanism is turned off. This avoids the processing penalty associated with COW faults. The operating system compiles a history record of writes and potential COW faults associated with socket and application program pairs. The recorded behaviour of the application is the potential COW faults as opposed to actual COW faults using a mechanism which will be described further below. This mechanism ensures that even if zero copy transfer is deactivated for a given application program, the potential COW faults for the application are still monitored and recorded.

Once the number of writes for any given socket and application pair reaches a threshold, the recorded ratio of potential COW faults to writes is used to determine whether the zero copy mechanism should be active or inactive for subsequent writes by the applications on the paired socket. For example, if more than 25% of writes by a given application on a given socket potentially produce COW faults then the zero copy mechanism may be deactivated for subsequent writes for the pair. The threshold for number of writes to a given socket pair that enables the history record to collect sufficient data is determined by testing. Similarly, the threshold percentage of potential COW faults for deactivating the zero copy mechanism is determined by testing. Both thresholds can be tuned to provide optimum performance in an active operating system.

Actual COW faults are detected automatically by the memory management system in the kernel. However, if the zero copy mechanism is deactivated then no COW faults will occur. In the present embodiment, the history record is used to record the location of the application buffer that is used for any given write that is in progress. This process is carried out regardless of whether or not the zero copy mechanism is activated. If a subsequent write uses any part of the buffer of a previous write that is not yet complete then a potential COW fault is generated. Once any given write is complete its record in the history record is removed.

Figure 2:
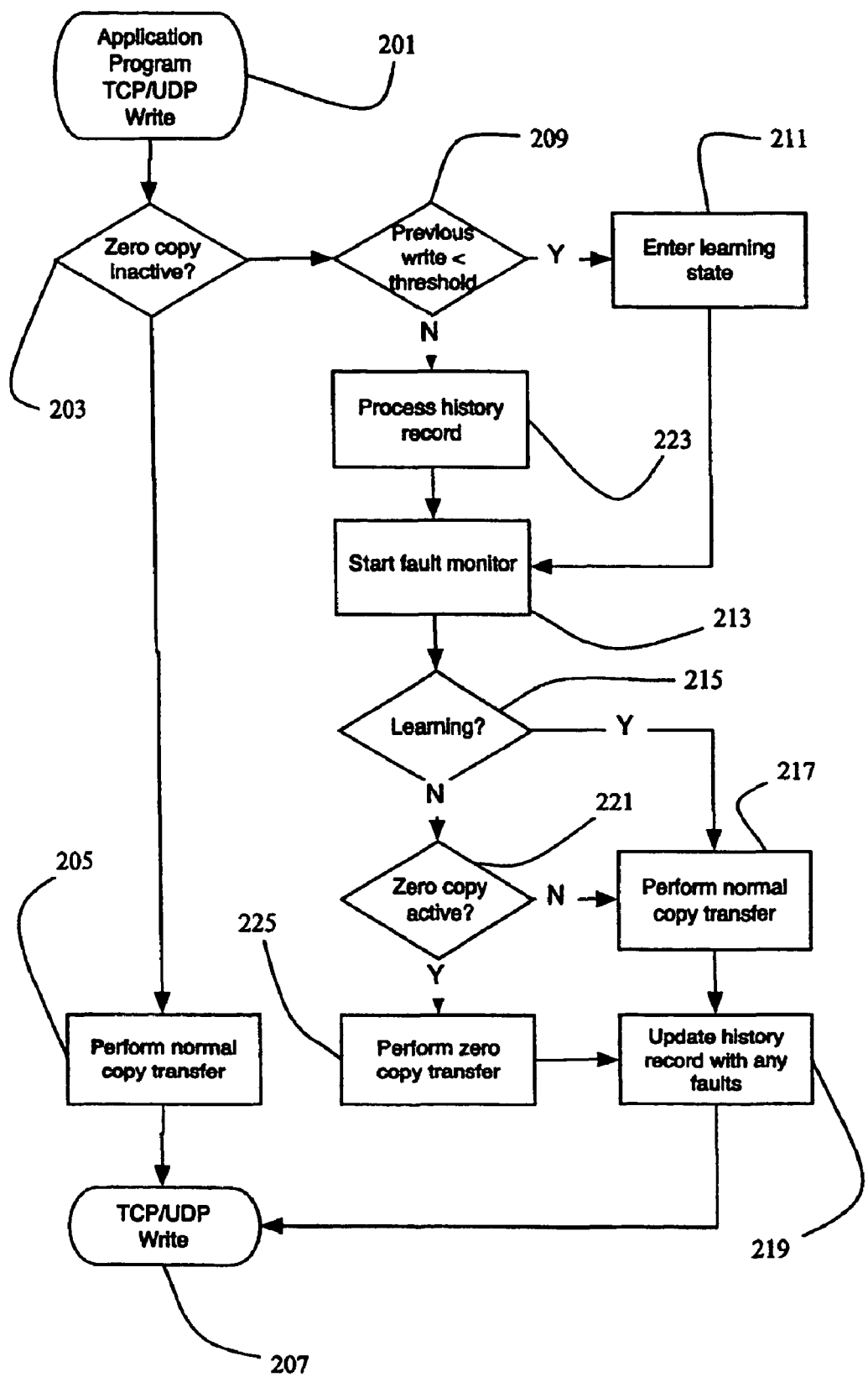
FIG. 2 is a flow chart illustrating the operation of a computer in the network of FIG. 1.

The processing of the operating system will now be described with reference to the flow chart of FIG. 2 which is triggered at step 201 when an application program initiates a network (TCP or UDP) write. Processing moves to step 203 where a check is carried out to see if the zero copy mechanism is active or not. If not processing moves to step 205 where a normal copy of the data from the application program buffer into the kernel buffer is performed and processing moves to step 207 where the kernel module 115 passes the data to the network socket module 207.

If at step 203 the zero copy mechanism is active then processing moves to step 209 where the history record is queried to check if the number of writes for the application program and socket pair has exceeded the learning threshold for the history record. If not, processing moves to step 211 where a learning state variable is set to "Learn" and processing continues to step 213 where the COW fault monitoring process is activated for the duration of the current socket write by logging the buffer being used in the history record. Processing then moves to step 215 where if the history record is in learning mode (determined by the state variable noted above) then processing moves to step 217 where the zero copy mechanism is avoided and a normal copy process for the data transfer is carried out as described above for step 205. Processing then moves to step 219 where the COW fault monitoring process checks for potential faults for the current write by searching for any existing write in the history record which uses the same memory space as the current write. If such an existing write is found a potential COW fault is logged against the entry for the current application/socket pair in the history record. Also, the history record entry for the application/socket pair is updated to increment the number of writes for the socket/application pair and to remove any entries for completed writes. Processing then moves to step 207 where the network socket layer carries out the requested write as described above.

If at step 209 the learning threshold has been exceeded then processing moves to step 223 where the history record entry for the current application/socket pair is processed to establish if the COW fault threshold has been exceeded. In the present embodiment, the COW fault threshold is 30%, that is, 30% of writes to the pair have produced potential faults. If the number of potential COW faults so far detected is below the threshold then a state variable is set to "Active". If however the threshold has been exceeded then the state variable is set to "Non-active". In some cases, the ratio of potential COW faults to writes detected for a given application/socket pair may reduce thereby reintroducing the zero copy mechanism for that pair which had previously been deactivated.

Processing then moves to step 213 starting the fault monitor as described above and on through step 215 to step 221. At step 221, if the state variable noted above is set to "Non-active" then processing moves to step 217 where the normal copy mechanism is used to transfer the data. If however, at step 221 the zero copy state variable is set to "Active" then processing moves to step 225 where the zero copy mechanism is used to perform the transfer of data from the application module to the network socket module. After both steps 217 and 225, processing moves to step 219 where the history record entry for the application/socket pair is updated to increment the number of writes and the number of potential COW faults if any have been detected. Processing then moves to step 207 where the network socket layer carries out the requested write as described above.

An example of the data gathered by the history record in the learn mode described above is set out below:

| Socket Id. | Application | Port Number | Writes | Faults |
| --- | --- | --- | --- | --- |
| 0x49623700 | SOCK_DGRAM | 49372 | 1 | 0 |
| 0x49623700 | SOCK_STREAM | 1712 | 1 | 0 |
| 0x49623400 | SOCK_STREAM | 49355 | 1 | 0 |
| 0x49623400 | SOCK_STREAM | 49198 | 2 | 0 |
| 0x494ebcc0 | SOCK_STREAM | 49357 | 2 | 0 |
| 0x49623700 | SOCK_STREAM | 49198 | 2 | 0 |
| 0x48fe2980 | SOCK_STREAM | 49358 | 2 | 0 |
| 0x4953de00 | SOCK_STREAM | 49198 | 2 | 0 |
| 0x494eb6c0 | SOCK_STREAM | 49359 | 2 | 0 |
| 0x4953de00 | SOCK_DGRAM | 49373 | 1 | 0 |
| 0x4953de00 | SOCK_DGRAM | 49374 | 1 | 0 |
| 0x4953de00 | SOCK_DGRAM | 49375 | 1 | 0 |
| 0x4953de00 | SOCK_DGRAM | 49376 | 1 | 0 |
| 0x48cf6e40 | SOCK_STREAM | 1933 | 97 | 33 |

In the scenario above most of the data gram traffic does not generate potential COW faults thereby zero copy can be activated for those connections. However, after nearly 100 writes, 33 of the writes of the SOCK_STREAM program potentially produce COW faults. This data is used to define the learning threshold for this application/socket pair or connection. The zero copy threshold can set by comparing system performance with the threshold set at different levels.

In an alternative embodiment, instead of potential COW faults being monitored as noted above, the actual COW faults generated by the memory management system are monitored instead. While no such faults will occur while the zero copy mechanism is deactivated, useful data can be gathered while the mechanism is active. This data can then be used to adaptively activate or deactivate the mechanism as described above.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via various transmission or storage means such as computer network, floppy disc, CD-ROM or magnetic tape so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for managing data transfer in a computer memory of a client computer connected via a TCP/IP network to a server computer comprising the steps of:
   determining whether a zero copy data transfer provided by page remapping is active for an application program when a learning threshold has been exceeded, wherein said determination is based on a threshold percentage of potential copy on write (COW) faults recorded for said application program in each of previous data transfers from an application program memory in the computer memory to a network socket in a kernel memory, wherein a kernel module uses the network socket to transfer the data to the server computer via the TCP/IP network, and wherein said learning threshold is based on a number of writes between said application program and said network socket;

transferring data associated with said application program from said application program memory to said network socket using said zero copy data transfer when the zero copy data transfer provided by the page remapping is active;

transferring data associated with said application program from said application program memory to an another memory location and then transferring said data from said another memory location to said network socket using a normal copy data transfer when the zero copy data transfer provided by the page remapping is inactive;

monitoring the number of potential copy on write (COW) faults by said application program in subsequent data transfers from said application program memory to said network socket;

activating the use of zero copy data transfer by said application program for transferring data to said network socket in subsequent data transfers when said monitored potential COW faults by said application program falls below a predetermined threshold; and continuing deactivating the use of zero copy transfer and transferring data associated with said application program from said application memory so that the data to be transferred from the application memory is first copied to an another memory location and then transferring said data from said another memory location to said network socket in a subsequent transfer when said monitored potential COW faults exceeds said predetermined threshold.

2. The method according to claim 1 in which said monitoring is carried out for a plurality of application programs and the results of said monitoring are recorded in a record.

3. The method according to claim 2 in which the record for each application program includes a port number, number of writes to the socket and the number of potential COW faults associated with said application program.

4. The method according to claim 1 in which said another memory location is in kernel memory.

5. The method according to claim 1 in which said monitoring and controlling are carried out by the networking or socket code.

6. The method according to claim 1 in which the threshold percentage for an application program is 30%.

7. The method according to claim 1 in which the predetermined threshold is 50%.

8. A computer program or group of computer programs when executed by a computer or group of computers, causes the computer or group of computers to carry out the method of claim 1.

9. Apparatus for managing data transfer in a computer memory of a client computer connected via a TCP/IP network to a server computer comprising:
a computer; and
computer memory, wherein
transfer means, residing in the computer memory, operable by the computer to determine whether a zero copy data transfer provided by page remapping is active for an application program when a learning threshold has been exceeded, wherein said determination is based on a threshold percentage of potential copy on write (COW) faults recorded for said application program in each of previous data transfers from an application program memory in the computer memory to a network socket in a kernel memory, and wherein a kernel module uses the network socket to transfer the data to the server computer via the TCP/IP network, transfer data associated with said application program from an application program memory to a network stack using zero copy data transfer when said zero copy data transfer provided by page remapping is active, and to transfer said data associated with said application program from said application program memory to an another memory location and then transferring said data from said another memory location to said network stack when said zero copy data transfer is inactive for said application program, and wherein said learning threshold is based on a number of writes between said application program and said network socket;

monitoring means, residing in the computer memory, operable by the computer to monitor the number of potential copy on write (COW) faults generated by said application program in subsequent data transfers from said application program memory to said network socket; and control means, residing in the computer memory, operable by the computer to activate the use of zero copy data transfer by said application program for transferring data to said network socket when the number of potential COW faults falls below a predetermined threshold in subsequent data transfers for said application program, to continue to deactivate use of zero copy transfer for transferring data associated with said application program from said application memory to said network socket in a subsequent transfer when the number of potential COW faults for said application exceeds said predetermined threshold for said application program.

10. The apparatus according to claim 9 in which said monitoring means is operable to monitor a plurality of application programs and the results of said monitoring are recorded in a record.

11. The apparatus according to claim 10 in which the record for each application program includes a port number, number of writes to the socket and the number of potential COW faults associated with said application program.

12. The apparatus according to claim 9 in which said another memory location is in kernel memory.

13. The apparatus according to claim 9 in which said monitoring and controlling means are provided by the networking or socket code.

14. The apparatus according to claim 9 in which the threshold percentage for an application program is 30%.

15. The apparatus according to claim 9 in which the predetermined threshold is 50%.

16. A computer program or group of computer programs when executed by a computer or group of computers, causes the computer or group of computers to provide the apparatus of claim 9.

17. A method of controlling data transfer between an application program layer and a socket layer in a Unix™ operating system on a client computer connected via an TCP/IP network to a server computer comprising:

determining whether a zero copy data transfer provided by page remapping is active for an application program when a learning threshold has been exceeded, wherein said determination is based on a threshold percentage of potential copy on write (COW) faults recorded for said application program in each of previous data transfers from an application program memory in the application program layer to a network socket in a kernel memory, wherein a kernel module uses the network socket to transfer the data to the server computer via the TCP/IP network, and wherein said learning threshold is based on a number of writes between said application program and said network socket;

transferring data associated with said application program from said application program memory to said network socket using zero copy transfer when the zero copy data transfer provided by the page remapping is active;

transferring data associated with said application program from said application memory to an another memory location and then transferring said data from said another memory location to said network socket using normal copy data transfer when the zero copy data transfer provided by the page remapping is inactive;

monitoring the number of actual copy on write (COW) faults generated by said application program in subsequent data transfers from said application program memory to said network socket;

activating the use of zero copy data transfer by said application program for transferring data to said network socket when the monitored number of potential COW faults for said application program falls below a predetermined threshold; and continuing deactivating use of zero copy transfer and transferring subsequent data using normal copy transfer when the monitored number of potential COW faults exceeds said predetermined threshold for said application.

* * * * *